United States Patent [19]

Rogers et al.

[11] Patent Number: 4,796,916

[45] Date of Patent: Jan. 10, 1989

[54] INHIBIT CONTROL OF A BELTED VEHICULAR PASSIVE RESTRAINT SYSTEM HAVING DOOR-MOUNTED RETRACTORS

[75] Inventors: Lloyd W. Rogers, Utica; David E. Compeau, Mt. Clemens, both of Mich.

[73] Assignee: General Motors Corporation, Detroit, Mich.

[21] Appl. No.: 134,171

[22] Filed: Dec. 16, 1987

[51] Int. Cl.⁴ .............................................. B60R 22/40
[52] U.S. Cl. ..................................... 280/803; 280/806
[58] Field of Search .................... 280/803, 806, 807; 297/480; 242/107.4 A, 107.4 B

[56] References Cited

U.S. PATENT DOCUMENTS

| | | | |
|---|---|---|---|
| 4,181,326 | 1/1980 | Hollowell et al. | 280/806 |
| 4,235,455 | 11/1980 | Collins et al. | 280/806 |
| 4,688,825 | 8/1987 | Arbogast et al. | 280/806 |
| 4,703,950 | 11/1987 | Pickett | 280/806 |

*Primary Examiner*—David M. Mitchell
*Assistant Examiner*—Ross Weaver
*Attorney, Agent, or Firm*—Mark A. Navarre

[57] ABSTRACT

Each vehicle door in which a retractor is mounted includes a jamb switch mounted in the door jamb for sensing actual opening of the door, and a lock switch mounted in the door lock assembly for sensing actuation of the interior or exterior door handles. When door opening or closure is indicated, locking of the retractors is inhibited for a predetermined interval. Logical agreement between the lock and jamb switches is required to maintain the inhibit beyond the predetermined interval while the door is open. If agreement is not achieved within the interval, a switch failure is presumed, and the inhibit is removed to permit normal locking of the retractors. If such agreement is achieved, the inhibit is maintained until closure of the door, and thereafter for another predetermined interval. If the switches fail to remain in agreement after closure of the door, further operation of the inhibit on subsequent opening of the door is disabled.

7 Claims, 2 Drawing Sheets

INHIBIT CONTROL OF A BELTED VEHICULAR PASSIVE RESTRAINT SYSTEM HAVING DOOR-MOUNTED RETRACTORS

This invention relates to belted vehicular passive restraint systems having motion sensitive locking belt retractors mounted in the vehicle doors, and more particularly to a control which prevents the retractors from locking in response to normal opening and closing of the vehicle door.

BACKGROUND OF THE INVENTION

Belted vehicular restraint systems commonly utilize ratcheting belt retractors which lock the belt to restrain the vehicle occupant when a motion sensitive element in the retractor experiences acceleration in excess of a predetermined threshold. The retractors may be mounted on the vehicle body or in the vehicle door, depending on the installation.

In one type of restraint system, one or more of the retractors are mounted in the vehicle door and the belts are adapted to be continuously coupled to provide a passive (automatic) restraint system. In such a system, the door-mounted retractors tend to lock the belts around the occupant in response to sudden open or closure of the vehicle door. To overcome this inconvenience, systems of this type commonly include an electrically or mechanically activated mechanism which desensitizes the motion sensitive element of the retractor when the vehicle door is opened. See, for example, the U.S. Pat. No. Compeau et al. 4,598,932 and Arlauskas et al. U.S. Pat. No. 3,692,328, both assigned to the assignee of the present invention.

SUMMARY OF THE PRESENT INVENTION

The present invention is directed to an improved failsafe control for the motion desensitizing mechanisms of a belted passive restraint system having door-mounted belt retractors. Each vehicle door in which a retractor is mounted includes a jamb switch mounted in the door jamb for sensing actual opening of the door, and a lock switch mounted in the door lock assembly for sensing actuation of the interior or exterior door handles.

When either of the door switches indicates nonclosure of the door, the control of this invention immediately triggers energization of the motion desensitizing mechanisms and maintains such energization for a predetermined interval. If the jamb and lock switches are in logical agreement within the predetermined interval, the operation of the switches is validated and the desensitizing mechanisms are maintained in an energized state so long as the door is open. If the switches are not in logical agreement by the end of the predetermined interval, a switch malfunction is presumed and the desensitizing mechanisms become deenergized at the expiration of such interval.

Once the desensitizing mechanisms are energized and either of the door and jamb switches indicates door closure, the energization is continued for an additional predetermined interval. As soon as the jamb and lock switches are in logical agreement, operation of the switches is validated and the control is reset for energizing the desensitizing mechanisms as described above in response to the next opening of the door. If the logical agreement is not achieved, a switch malfunction is presumed and the control is not reset for further energization of the desensitizing mechanisms.

In the manner described above, the control of this invention properly prevents locking of the belts when the vehicle doors are being opened, and additionally ensures safe operation of the restraint system if proper logical agreement of the jamb and lock switches is lacking.

DETAILED DESCRIPTION OF THE DRAWINGS

Figure 1:
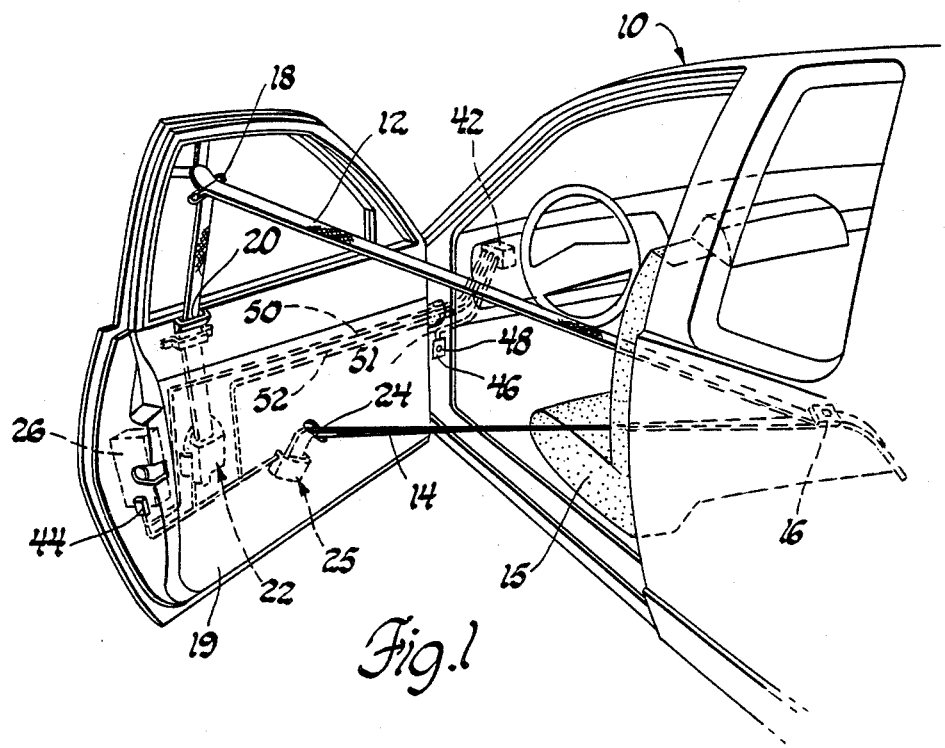
FIG. 1 is a schematic view of a vehicular passive restraint system according to this invention.

Referring to FIG. 1, the reference numeral 10 generally designates a vehicle body having a door mounted passive seat belt system. The belt system includes a shoulder belt 12 and a lap belt 14 having inboard ends anchored on the vehicle body inboard of the vehicle seat 15 by a release buckle 16. The outboard end of the shoulder belt 12 passes through a guide loop 18 mounted on the upper rear corner of the door 19, and extends downward therefrom through a door opening 20 to the reel of a shoulder belt retractor 22 mounted inside the door 19. The outboard end of the lap belt 14 extends through a door opening 24 to the reel of a lap belt retractor 25, also mounted inside the door 19.

When the door 19 is opened to the position depicted in FIG. 1, the shoulder and lap belts 12, 14 unwind from their respective retractors 22, 25, and the door movement swings the outboard ends of the belts 12 and 14 forward of the seat 15 to facilitate ingress and egress. When the occupant enters the seat 15 and closes the door 19, the door mounted retractors 19, 25 rewind the shoulder and lap belts 12, 14 to their restraining positions about the seated occupant. The vehicle door 19 carries a latch 26 which mates with a striker pin mounted on the vehicle body when the door 19 is closed to latch the door 19 in the closed position.

Figure 2:
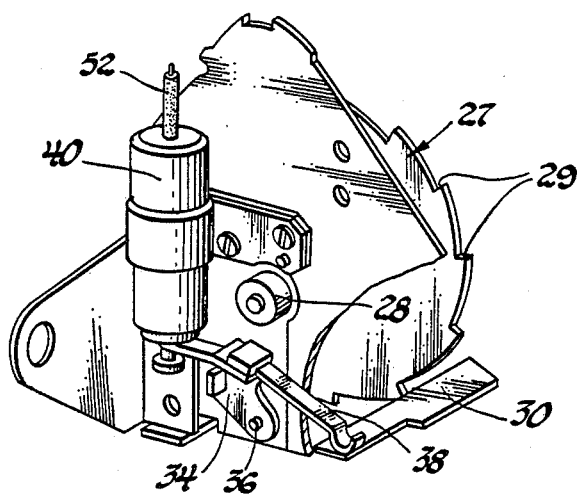
FIG. 2 is a cut away perspective view of a belt retractor and electrically deactivated motion desensitizing mechanism of the type schematically depicted in FIG. 1.

The shoulder and lap belt retractors 22 and 25 are of the inertia locking type, a representative retractor being illustrated in some detail in FIG. 2. The illustrated retractor includes a belt reel 27 rotatably mounted on a reel shaft 28. The reel 27 carries ratchet teeth 29 adapted to be engaged by a lock bar 30. The lock bar 30 is normally held away from the teeth 29, but is adapted to be pivoted into engagement with the teeth 29 by an inertia responsive pendulum, not shown.

Since the retractors 22 and 25 are mounted on the door 19, a sudden opening or closing movement of the door may cause the pendulum to move the lock bar 30 into engagement with the teeth 29, thereby locking the reel against belt unwinding rotation. Accordingly, it is known to provide mechanisms responsive to the condition of the door latch for desensitizing the inertia locking mechanism when the door is opened; see, for example, the above-referenced U.S. Pat. No. Arlauskas et al. 3,692,328, Augunas et al. U.S. Pat. No. 3,727,943 and Compeau et al. U.S. Pat. No. 4,598,832. FIG. 2 shows such a mechanism, including a lever 34 pivotable about pin 36, carrying a leaf spring 38 which holds lock bar 30 away from the ratchet teeth 29 when solenoid 40 is energized.

Retractor solenoids associated with the shoulder and lap belt retractors of the driver and front passenger doors of the vehicle are selectively energized by an electrical control module, generally designated in FIG. 1 by the reference numeral 42, in accordance with the condition of the driver and front passenger doors.

The condition of the driver and front passenger vehicle doors is sensed by lock and jamb switches mounted in relation to each such door. The lock switches, represented by the switch 44 in FIG. 1, are mounted on the respective vehicle door, and are operatively connected to the respective door latch 26, as set forth in Compeau et al. U.S. Pat. No. 4,598,932. Such switches are normally open and close when the respective inside or outside door handle is pulled, or when the respective latch bolt is moved to its unlatched position. The jamb switches, represented by the switch 46 in FIG. 1, are mounted in the respective door jambs. Such switches include a plunger 48 which is depressed (open) when the respective vehicle door is in a closed position, and released (closed) when the respective vehicle door is in an open position.

The control module 42 senses the logical state (that is, open or closed) of the various lock and jamb switches 44 and 46, as indicated in FIG. 1 by the conductors 50 and 51. Based on the information deduced therefrom, the module 42 controls the energization of the shoulder and lap belt retractor solenoids, as indicated in FIG. 1 by the conductor 52. A circuit diagram of the module 42 is set forth in FIG. 3, described below.

Figure 3:
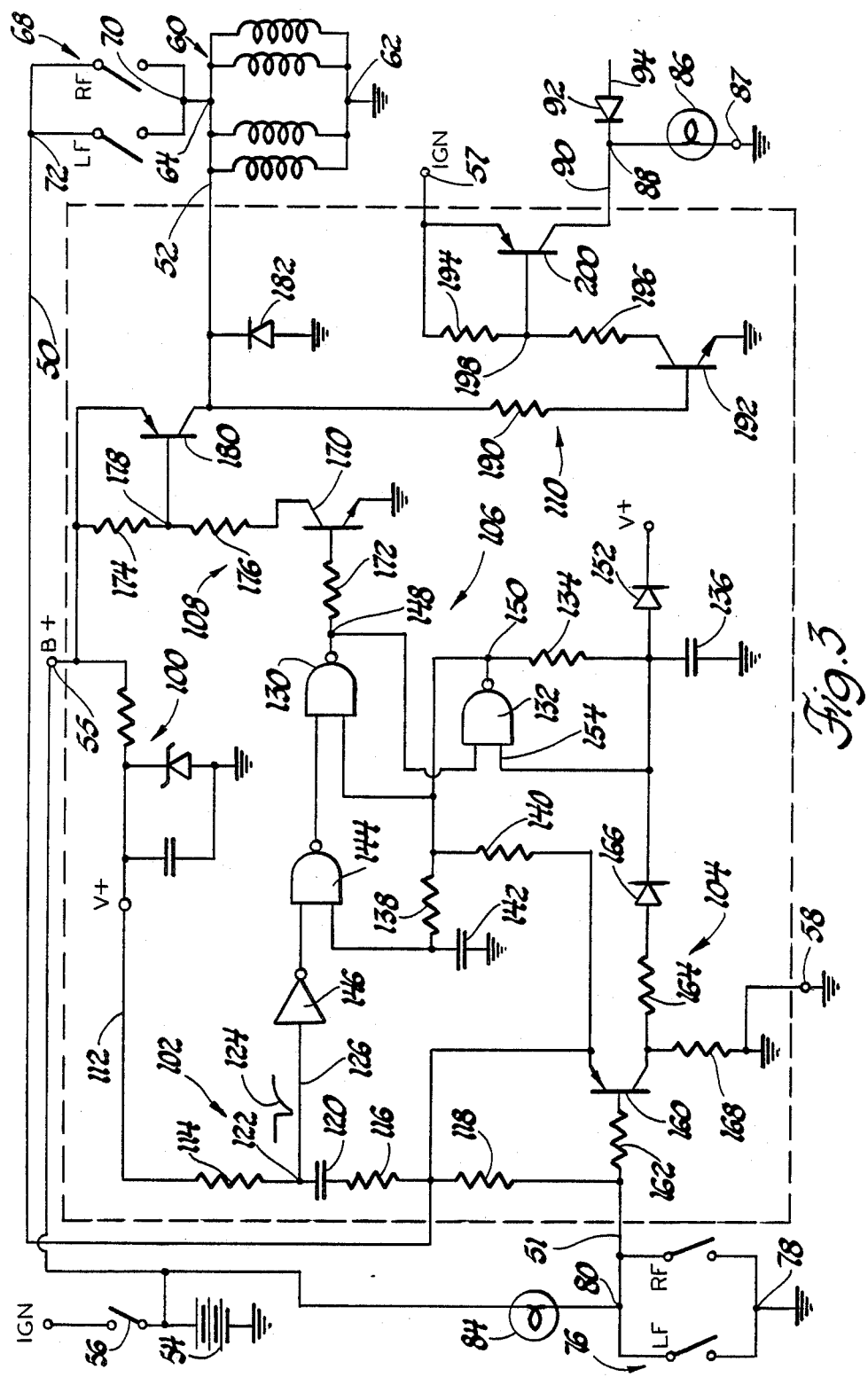
FIG. 3 is a circuit diagram for mechanizing the control of this invention.

FIG. 3 depicts the control module 42 in the environment of a conventional motor vehicle. Components corresponding to those depicted in FIGS. 1 and 2 have been assigned the same reference numerals, where appropriate.

Power for the control module 42 is provided by the vehicle storage battery 54. The unswitched voltage thereof is designated B+, and is provided as an input to control module 42 as indicated at the module input terminal 55. A conventional ignition switch 56 defines a switched source of battery voltage designated IGN, such voltage being supplied as an input to control module 42, as indicated at the module input terminal 57. A vehicle ground for the control module 42 is provided at terminal 58.

The installation depicted in FIG. 3 assumes the existence of lap and shoulder belt retractors for both the left front (LF) and right front (RF) vehicle doors. The solenoid coils for such retractors are connected in parallel for concurrent energization by the control module 42, as generally designated by the reference numeral 60. Terminal 62 of the parallel coil circuit 60 is connected to the vehicle ground and terminal 64 thereof is connected to the control module 42 via line 52.

The RF lock switch is connected in parallel with the LF lock switch, as indicated by the reference numeral 68. Terminal 70 of the parallel switch circuit 68 is connected to the solenoid coil terminal 64 and terminal 72 thereof is connected to control module 42 via line 50.

The RF jamb switch is similarly connected in parallel with the LF jamb switch, as indicated by the reference numeral 76. Terminal 78 of the parallel switch circuit 76 is connected to the vehicle ground; terminal 80 thereof is connected to the control module 42 via line 51 and to the unswitched voltage B+ via a vehicle courtesy lamp 84.

When both of the vehicle doors are closed, the jamb and lock switches are all open, as depicted in FIG. 3. In such event, the lock switch input signal on line 50 is open circuited and the jamb switch input signal on line 51 is substantially at the terminal voltage B+ of battery 54.

When the handle of either or both front vehicle doors is actuated to open the respective door, the lock switch input signal on line 50 assumes the voltage of the solenoid coil terminal 64. If the solenoid circuit 60 is energized, the lock switch input signal is substantially at B+. If the solenoid circuit 60 is deenergized, the lock switch input signal is substantially at ground potential, since the control module input impedance is relatively high compared to the coil circuit 60. When either or both of the doors subsequently open, the courtesy lamp 84 is lit and the jamb switch input signal on line 51 falls substantially to ground potential.

The lamp 86 is adapted to be mounted in relation to the instrument panel of the vehicle for illuminating a restraint system indication. Terminal 87 of lamp 86 is connected to the vehicle ground, while terminal 88 is connected to the control module 42 via line 90. As described below, the control module operates to turn on the lamp 86 for illuminating the restraint system indication whenever the solenoid circuit 60 is energized to desensitize the lap and shoulder belt retractors. The lamp 86 is also adapted to be temporarily energized by a separate circuit including the diode 92 and conductor 94 in the event the restraint system has been deactivated.

The control module 42 includes circuitry responsive to the above described input signals for suitably energizing the solenoid circuit 60 and the indicator lamp 86. For the purpose of this description, the circuitry is considered to comprise six functional subcircuits: a REGULATOR circuit 100, a DOOR SWITCH TRIGGER circuit 102, a LOGIC HOLD circuit 104, a MONOSTABLE circuit 106, a DRIVER circuit 108 and an INDICATOR circuit 110.

The REGULATOR circuit 100 is connected to the unswitched battery voltage B+ and comprises a resistor-capacitor-Zener diode network which regulates the system voltage and protects the module 42 from damage due to overvoltage. The voltage output of REGULATOR circuit 100 is designated V+ and is connected via line 112 to the DOOR SWITCH TRIGGER circuit 102.

The DOOR SWITCH TRIGGER circuit 102 is an RC network comprising the resistors 114–118, and the capacitor 120. In the rest or inactive state, there is substantially no voltage potential across capacitor 120. When a vehicle door handle is actuated, however, the respective lock switch closes to define a charge path for capacitor 120 through line 50 and the solenoid coil circuit 60. The charging current in such event is well below that required to energize the solenoid circuit 60 for desensitizing the motion sensitive mechanisms in the shoulder and lap belt retractors. The lock switch closure produces a momentary reduction in the voltage present at the capacitor terminal 122, as indicated by the waveform 124. In the event of a lock switch failure (failed open), closure of the respective jamb switch upon initial movement of the door provides a similar charge path for capacitor 120 through the line 51 and the respective jamb switch. The voltage at capacitor terminal 122 is supplied via line 126 as an input to the MONOSTABLE circuit 106 for initiating energization of the solenoid circuit 60, as described below.

The MONOSTABLE circuit 106 comprises a pair of NAND gates 130-132 defining a flip-flop circuit and resistor-capacitor elements 134, 136 defining a timer circuit. As described below, the flip-flop circuit output is supplied as an input to the DRIVER circuit 108 for controlling the energization of the solenoid circuit 60. An additional RC network comprising the resistors 138-140 and the capacitor 142 determines the rest or inactive state of MONOSTABLE circuit 106.

In the inactive state, the capacitor 142 is charged through the resistors 138, 140 and 118 and the filament of lamp 84, thereby maintaining one input of NAND gate 144 at a logic one voltage level. The other input of NAND gate 144 is connected to the capacitor terminal 122 of DOOR SWITCH TRIGGER circuit 102 via inverter 146 and line 126 and is therefore maintained at a logic zero voltage level during the inactive state. Accordingly, the inactive state output of NAND gate 144 is a logic one voltage level. This presets the flip-flop circuit so that its output terminal 148 assumes a logic zero voltage level and defines a charge path for the capacitor 136 via resistor 134 and the output terminal 150 of NAND gate 132. Thus, capacitor 136 is charged substantially to battery voltage B+ while control module 42 is in its rest or inactive state. A diode 152, connected between capacitor 136 and the regulated voltage V+, protects the NAND gates 130, 132 and 144 in the event of a battery disconnection by maintaining the voltage inputs applied thereto within a diode drop of the supply voltage V+.

When the MONOSTABLE circuit 106 is in the state described above, a momentary voltage drop such as depicted by the waveform 124 on line 126 will cause the state of the flip-flop circuit to reverse. In such case, the output terminal 148 of flip-flop rises to a logic one voltage level, thereby triggering energization of the solenoid circuit 60 by DRIVER circuit 108, and the terminal 150 falls to a logic zero voltage level. This condition is maintained so long as a logic one voltage level is supplied to the input 154 of NAND gate 132. Initially, such a voltage is supplied to input 154 by the capacitor 136. However, as the capacitor 136 discharges through resistor 134 and the output of NAND gate 132, the voltage supplied to the input 154 eventually (after about 2 seconds) falls to a logic zero level and the flip-flop circuit reverses to its initial state to trigger deenergization of the solenoid circuit 60.

The LOGIC HOLD circuit comprises a transistor 160 responsive to closure of both lock and jamb switches for maintaining the capacitor 136 of MONOSTABLE circuit 106 in a charged state. The transistor emitter is connected directly to the lock switch input signal line 50, and the transistor base is connected via resistor 162 to the jamb switch input signal line 51. The transistor collector is connected to the capacitor 136 via resistor 164 and diode 166. When both lock and jamb switch input signals are activated, transistor 160 is biased into conduction.

If the solenoid coil circuit 60 is already energized, the charge on capacitor 136 of the MONOSTABLE circuit 106 is maintained by a charge path comprising DRIVER circuit 108, input line 50, the emitter-collector circuit of transistor 160, resistor 164 and diode 166. The resistor 168 provides an additional current path for the transistor 162 in order to "wet" the lock switch contacts and prevent conduction of the transistor due to moisture-related leakage thereacross. When either of the lock and jamb switch inputs changes, transistor 160 is biased nonconductive and capacitor 136 begins to discharge through resistor 134 as described above.

The DRIVER circuit 108 energizes the solenoid circuit 60 in accordance with the state of the MONOSTABLE circuit flip-flop, as indicated above. The flip-flop output terminal 148 is connected to the base of DRIVER circuit transistor 170 through resistor 172. The emitter-collector circuit of transistor 170 connects a resistor divider comprising the resistors 174 and 176 between unswitched battery voltage B+ and ground potential. The junction 178 between resistors 174 and 176 is connected to the base of DRIVER circuit transistor 180, the emitter-collector circuit of which connects unswitched battery voltage B+ to the solenoid circuit 60. Thus, a logic one voltage level at the output terminal 148 of the MONOSTABLE circuit flip-flop biases DRIVER circuit transistors 170 and 180 conductive to energize the solenoid circuit 60. A logic zero voltage level at output terminal 148 biases transistors 170 and 180 nonconductive to deenergize the solenoid circuit 60. A free-wheeling diode 182 is connected across the solenoid circuit 60 to protect the DRIVER circuit transistor 180 by circulating inductive energy stored in the solenoid circuit 60 at deenergization thereof.

The INDICATOR circuit 110 operates in response to energization of the solenoid circuit 60 to energize the indicator lamp 86 for alerting the operator of the vehicle to the desensitization of the restraint system. The collector of DRIVER circuit transistor 180 is connected via resistor 190 to the base of INDICATOR circuit transistor 192. The emitter-collector circuit of transistor 192 connects a resistor divider comprising the resistors 194 and 196 between switched battery voltage IGN and ground potential. The junction 198 between resistors 194 and 196 is connected to the base of INDICATOR circuit transistor 200, the emitter-collector circuit of which connects the switched battery voltage IGN to the indicator lamp 86. Thus, energization of the solenoid circuit 60 biases INDICATOR circuit transistors 192 and 200 conductive to energize the LAMP 86. Deenergization of the solenoid circuit 60 biases transistors 192 and 200 nonconductive to deenergize the lamp 86.

The operation of the control module 42 under normal conditions will now be described, assuming an initial rest or inactive condition. When any front door handle (inside or outside, LF or RF) of the vehicle is activated, the respective lock switch closes, causing the DOOR SWITCH TRIGGER circuit capacitor 120 to charge through the solenoid circuit 60. This produces a momentary voltage drop on line 124, triggering the MONOSTABLE circuit flip-flop to energize the solenoid circuit 60 through DRIVER circuit 108, and causing the INDICATOR circuit 110 to light indicator lamp 86 if the ignition switch 56 is closed. This condition is maintained for a timed period (approximately 2 seconds) by the charge across capacitor 136, which begins discharging through resistor 134. On initial movement of the respective vehicle door, the respective jamb switch also closes, energizing the courtesy lamp 84, and biasing the LOGIC HOLD circuit transistor 160 conductive to maintain capacitor 136 in a charged condition. This sustains the energization of solenoid circuit indefinitely, so long as both a lock switch and a jamb switch remain closed.

When the vehicle doors are swung to the closed position, the jamb switches open to deenergize the courtesy lamp 84 and bias the LOGIC HOLD circuit transistor 160 nonconductive. The solenoid energization is maintained by the charge across MONOSTABLE circuit capacitor 136 for the 2-second timed interval defined by the RC time constant of resistor 134 and capacitor 136. On actuation of the latch mechanisms 26, the lock switches open and capacitor 120 discharges through the courtesy lamp 84. At the end of the 2-second interval, the MONOSTABLE circuit flip-flop reverses to its initial state, deenergizing the solenoid circuit 60 and the indicator lamp 86 if lit.

In the event that a jamb or lock switch fails to close on opening of the vehicle door, logical agreement between the jamb and lock switch signal will not be achieved and the solenoid circuit energization will be limited to the 2-second interval defined by capacitor 136 and resistor 134 of MONOSTABLE circuit 106. If either switch fails open, the MONOSTABLE circuit flip-flop will change states to energize solenoid circuit 60, the but LOGIC HOLD circuit transistor 160 will remain nonconductive. At the expiration of the 2-second interval, the flip-flop will revert to its initial state, deenergizing the solenoid circuit 60. Upon closure of the door, the unfailed switch opens and the capacitor 120 discharges as described above to prepare the DOOR SWITCH TRIGGER circuit for the next door opening.

Likewise logical agreement between the lock and jamb switches is not achieved in the event that a jamb or lock switch fails to open on closure of the vehicle door. In such case, the LOGIC HOLD circuit transistor 160 is still biased nonconductive on door closure and the solenoid circuit energization is maintained only until the expiration of the 2-second interval of MONOSTABLE circuit 106. Additionally, such a failure of either the lock or jamb switches keeps the DOOR SWITCH TRIGGER circuit capacitor 120 charged so that further energization of the solenoid circuit when the vehicle door is subsequently opened in disabled. At such time, the operator may notice that the retractors are not being desensitized and will arrange for repair thereof. Until such repair is effected, the failsafe condition of the module 42 remains in effect so that the restraint system operates in a normal manner to protect the vehicle occupants. Additionally, if desired, circuitry may be provided for lighting the indicator lamp 86 whenever the capacitor 120 is charged; in the situation described above, the continuously lighted indicator lamp 86 would inform the operator and repairman of the failure.

In the manner described above, the control of this invention safely inhibits locking of the door mounted belt retractors. Logical agreement between the lock and jamb switches is required to maintain the inhibit beyond a predetermined interval while the door is open. If agreement is not achieved within the interval, a switch failure is presumed and the inhibit is removed to permit normal locking of the retractors. If such agreement is achieved, the inhibit is maintained until closure of the door, and thereafter for the predetermined interval. If the switches fail to remain in agreement after closure of the door, further operation of the inhibit is disabled.

While this invention has been described in reference to the illustrated embodiment, various modifications thereto will occur to those skilled in the art, and systems incorporating such modifications may fall within the scope of this invention, which is defined by the appended claims.

The embodiments of the invention in which an exclusive property or privilege is claimed are defined as follows:

1. In a motor vehicle seat belt system including a seat belt retractor mounted on a vehicle door, a motion sensitive mechanism for preventing belt movement through the retractor in response to a sensed motion, and a desensitizing mechanism energizable to inhibit operation of said motion sensitive mechanism, control apparatus for controlling energization of said desensitizing mechanism, comprising:

first and second switch means mounted in relation to the vehicle door for independently sensing and indicating closure or nonclosure of the vehicle door;

monostable means effective when either of said first and second switch means indicates nonclosure of the vehicle door for energizing said desensitizing mechanism for at least a predetermined interval; and means effective in response to a condition wherein if both of said first and second switch means indicate nonclosure of the vehicle door within the predetermined interval of energization effected by said monostable means, then the energization of said desensitizing means is sustained so long as such condition persists, but if both of said first and second switch means do not indicate nonclosure of the vehicle door within the predetermined interval of energization effected by said monostable means, then the desensitizing means is deenergised.

2. The apparatus set forth in claim 1, wherein the vehicle door includes a jamb and a latch mechanism, said first switch means is mounted in relation to said jamb, and said second switch means is mounted in relation to said latch mechanism.

3. In a motor vehicle seat belt system including a seat belt retractor mounted on a vehicle door, a motion sensitive mechanism for preventing belt movement through the retractor in response to a sensed motion, and a desensitizing mechanism energizable to inhibit operation of said motion sensitive mechanism, control apparatus for controlling energization of said desensitizing mechanism, comprising:

first and second switch means mounted in relation to the vehicle door for independently sensing and indicating closure or nonclosure of the vehicle door;

monostable means effective when triggered to energize said desensitizing mechanism for a predetermined interval;

trigger means for triggering said monostable means to energize said desensitizing mechanism at the onset of a nonclosure indication by either of said first and second switch means; and latch means effective (1) in response to a sensed normal condition wherein both of said first and second switch means indicate nonclosure of the vehicle door within the interval of energization effected by said monostable means, for latching said monostable means to sustain the energization of said desensitizing means so long as such normal condition persists, and (2) in response to a sensed failure condition wherein one of said first and second switch means fails to indicate nonclosure of the vehicle door within the interval of energization effected by said monostable means, for permitting the energization of said desensitizing mechanism to terminate upon expiration of said predetermined interval.

4. The apparatus set forth in claim 3, wherein said monostable means is effective after being latched by said latch means to maintain the energization of said desensitizing means for an additional predetermined interval after said first or second switch means indicates closure of said vehicle door.

5. The apparatus set forth in claim 3, wherein the trigger means is disabled upon closure of the vehicle door in a switch failure condition in which one of said first and second switch means fails to indicate such door closure, thereby to disable further energization of said desensitizing mechanism so long as such failure condition persists.

6. In a motor vehicle seat belt system including a seat belt retractor mounted on a vehicle door, a motion sensitive mechanism for preventing belt movement through the retractor in response to a sensed motion, and a desensitizing mechanism energizable to inhibit operation of said motion sensitive mechanism, apparatus for controlling energization of said desensitizing mechanism, comprising:

first and second switch means mounted in relation to the vehicle door for independently sensing and indicating closure or nonclosure of the vehicle door;

monostable means including flip-flop means effective when triggered to energize said desensitizing mechanism, timer means effective when fully charged for maintaining the energization effected by said flip-flop means for a predetermined interval following such energization, and charging means for maintaining said timer means in a fully charged condition prior to the energization of said desensitizing mechanism;

trigger means for triggering said flip-flop means at the onset of a nonclosure indication by either of said first and second switch means; and latch means effective (1) in response to a sensed normal condition wherein both of said first and second switch means indicate nonclosure of the vehicle door within the interval of energization effected by said monostable means, for maintaining said timer means in a fully charged condition so long as such condition persists, and (2) in response to a sensed switch failure condition wherein one of said first and second switch means fails to indicate nonclosure of the vehicle door within the interval of energization effected by said monostable means, for permitting the energization of said desensitizing mechanism to terminate upon expiration of said predetermined interval.

7. The apparatus set forth in claim 6, wherein the trigger means is disabled upon closure of the vehicle door in a switch failure condition in which one of said first and second switch means fails to indicate such door closure, thereby to disable further energization of said desensitizing mechanism so long as such failure condition persists.

* * * * *